United States Patent [19]

Ritter et al.

[11] Patent Number: 4,499,060

[45] Date of Patent: Feb. 12, 1985

[54] PROCESS FOR REMOVING HYDROGEN SULFIDE FROM GASES, PARTICULARLY COAL DISTILLATION GASES

[75] Inventors: Horst Ritter, Essen; Edmund-Theo Herpers, Bochum, both of Fed. Rep. of Germany

[73] Assignee: Dr. C. Otto & Comp. G.m.b.H., Bochum, Fed. Rep. of Germany

[21] Appl. No.: 463,678

[22] Filed: Feb. 4, 1983

[30] Foreign Application Priority Data

Feb. 12, 1982 [DE] Fed. Rep. of Germany ....... 3204907

[51] Int. Cl.$^3$ ...................... C01B 17/16; C01B 31/20
[52] U.S. Cl. .................................... 423/232; 423/234; 423/238
[58] Field of Search ................ 423/234, 238, 232, 220

[56] References Cited

U.S. PATENT DOCUMENTS

| | | | |
|---|---|---|---|
| 3,789,105 | 1/1974 | Tippmer et al. | 423/238 |
| 4,302,430 | 11/1981 | Weber et al. | 423/234 |
| 4,342,731 | 8/1982 | Ritter | 423/234 |

FOREIGN PATENT DOCUMENTS 1052537 4/1979 Canada.

1354769 5/1974 United Kingdom.

Primary Examiner—John F. Niebling
Assistant Examiner—B. J. Boggs, Jr.
Attorney, Agent, or Firm—Thomas H. Murray; Clifford A. Poff

[57] ABSTRACT

Hydrogen sulfide is first removed by ammoniacal liquor from coke oven gas in the bottom part of a gas scrubber. In the top part of the scrubber, two consecutively-arranged fine scrubbing stages remove hydrogen sulfide by treating the gases, in the upper stage, with a caustic soda solution or a caustic potash solution. Beneath the upper scrubbing stage is the second fine scrubbing stage fed with a subflow of an aqueous carbonate solution collecting at the outlet of the upper fine scrubbing stage and a subflow of cooled, regenerated carbonate solution discharged from the hydrogen-sulfide/hydrogen-cyanide stripper. From the hydrogen-sulfide/hydrogen-cyanide stripper, a second subflow is admixed with coal liquor for removing fixed ammonia therefrom in a separator. The separator produces water vapor with carbon dioxide vapors that are delivered to the hydrogen-sulfide/hydrogen-cyanide stripper for regenerating the aqueous carbonate washing solution.

7 Claims, 1 Drawing Figure

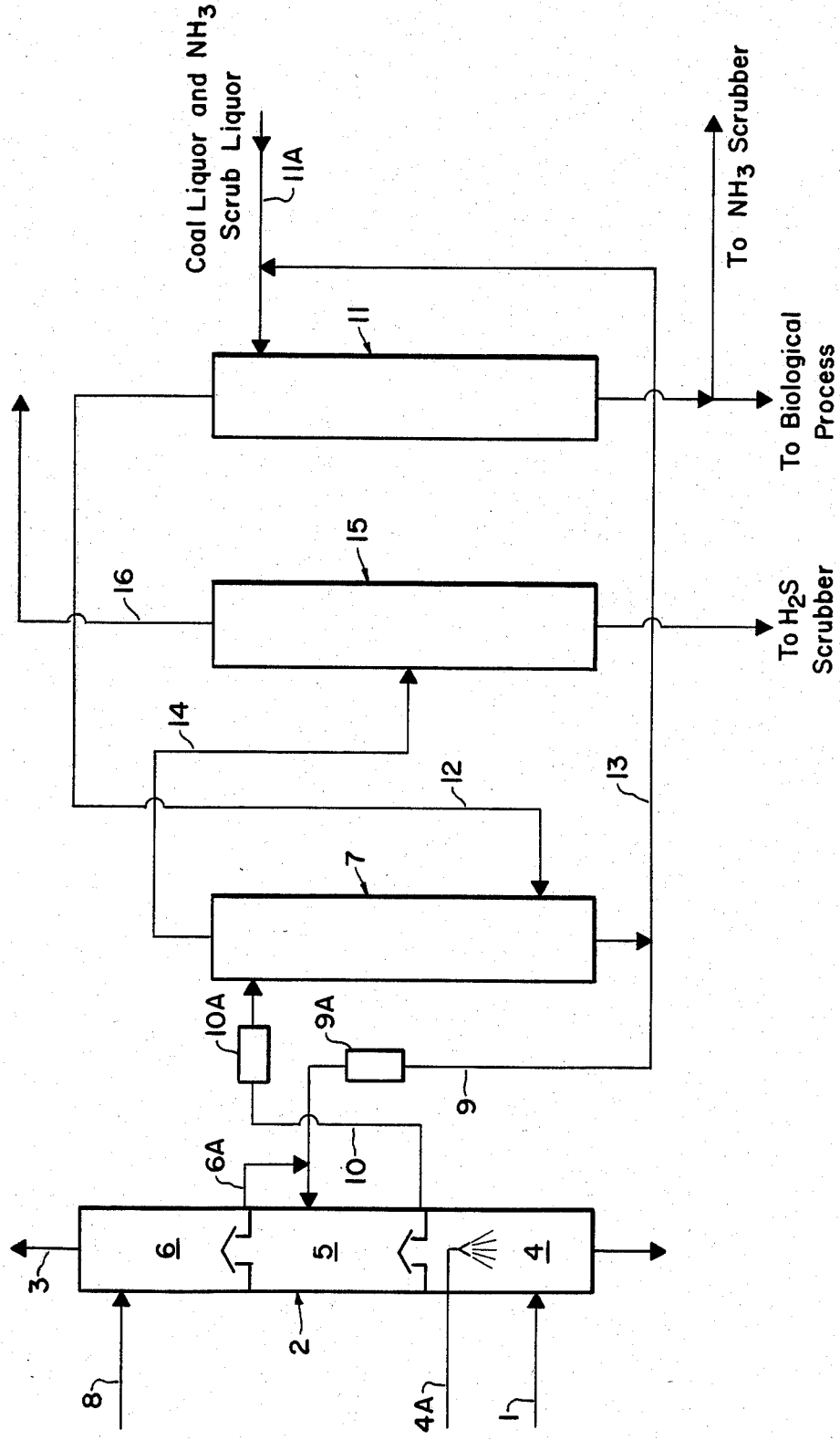

PROCESS FOR REMOVING HYDROGEN SULFIDE FROM GASES, PARTICULARLY COAL DISTILLATION GASES

BACKGROUND OF THE INVENTION

This invention relates to a process for removing hydrogen sulfide from gases, particularly coal distillation gases by first scrubbing the gases with ammoniacal liquor, and then in a fine purification stage, by scrubbing the gases with a caustic soda solution or a caustic potash solution, preferably with a concentration of about 3% to 5% NaOH.

It is known in the art to use an ammonia-containing scrubbing solution for coarse scrubbing of hydrogen sulfide out of gases, and after this coarse scrubbing process, to use a caustic soda solution to carry out a fine purification of the gas. It is also known in the art to directly utilize the spent sulfur-ladden caustic soda solution for separating fixed ammonia compounds when purifying coal distillation gases using the above process.

SUMMARY OF THE INVENTION

It is an object of the present invention to achieve a much better utilization of a caustic soda solution in a process for removing hydrogen sulfide from gases with ammoniacal liquor; while at the same time, assuring that sulfitic constituents do not enter the waste liquor.

Starting from a process of the type described hereinbefore, the present invention provides a process wherein a sublfow of an alkaline-washing solution is branched from a fine gas purification circuit and fed to a stripper column in which sulfide is stripped from the alkaline-washing solution with vapors containing carbon dioxide; such vapors being derived from an ammonia separator wherein sodium carbonate or potassium carbonate forms and the vapors which are derived from the stripper are fed to a deacidifier.

More particularly, according to the present invention, there is provided a process for removing hydrogen sulfide from gases, particularly coal distillation gases, wherein the process includes the steps of washing the gases with ammoniacal liquor to remove hydrogen sulfide, thereafter further washing the gases in a fine-purification stage with a washing solution having an effective alkaline constituent selected from the group consisting of caustic soda and caustic potash to further remove hydrogen sulfide, producing vapors including carbon dioxide by treating a subflow of the washing solution in an ammonia separator wherein sodium or potassium carbonate is also produced, stripping hydrogen sulfide from the washing solution with the vapors including carbon dioxide, and feeding the stripped hydrogen sulfide to a deacididifer.

It is advantageous to cool a subflow of the washing solution, e.g., an aqueous carbonate solution, from the outlet of the stripper column and then recycling the cooled subflow to the gas scrubber for further scrubbing hydrogen sulfide from the gases. It has been found, according to the present invention, that double separation of the spent caustic soda solution brings about, surprisingly, a much better utilization of the caustic soda solution. A first separation of this solution occurs in the stripper and then a second separation of the solution occurs in the separator by means of water vapor containing carbon dioxide.

According to a further development of the present invention, it is advantageous to produce a further subflow of the washing solution, e.g., an aqueous carbonate solution, at the outlet of the hydrogen sulfide stripper column and admix this further subflow at a temperature of about 100° C. with fixed ammonia compounds present in coal liquor. This insures that no sulfitic compounds reach the waste liquor.

Another advantageous development of the present invention is to provide two consecutive fine scrubbing stages in the gas scrubber for scrubbing gases, one stage being operated with the freshly-charged caustic soda solution or caustic potash solution; whereas the other stage is operated with a recycled carbonate solution derived from the firstmentioned stage.

These features and advantages of the present invention as well as others will be more fully understood when the following description of one exemplified embodiment of the present invention is read in light of the accompanying single FIGURE drawing thereof which diagrammatically illustrates a preferred embodiment of apparatus to carry out the process of the present invention.

Untreated gases, specifically for example, coke oven gases, are delivered by a line 1 to a prescrubber 4 in the bottom portion of a scrubber 2 into which ammoniacal liquor is sprayed by line 4A. In prescrubber 4, hydrogen sulfide is coarsely scrubbed from the gases. Ammoniacal liquor is drawn from the bottom of the prescrubber by a discharge line and preferably treated for reuse in the manner, per se, well known in the art. The scrubbed gases leave the top of the scrubber 2 by way of line 3. Above the prescrubber 4, there are two fine scrubbing stages 5 and 6 in the top part of the scrubber. In stage 5, the gases are first scrubbed with a weakly-concentrated scrubbing solution fed from a hydrogen-sulfide/hydrogen-cyanide stripper. This scrubbing solution contains mainly sodium carbonate that is advantageously recycled to increase the spray density. Further purification of the gases is carried out in the top fine scrubbing stage 6 by means of a dilute aqueous washing solution having an effective alkaline constituent selected from the group consisting of caustic soda and caustic potash. The washing solution is fed by line 8 to the top of the fine scrubbing stage 6. An example of such washing solution is a 3% to 5% dilute aqueous caustic soda solution, i.e., 3% to 5% NaOH solution. An equal quantity to the quantity of washing solution supplied by line 8 is delivered by way of an overflow to the fine scrubbing stage 5 beneath stage 6.

Since coke oven gases contain a relatively high proportion of carbon dioxide in addition to hydrogen sulfide and hydrogen cyanide, some of the caustic soda solution is used for scrubbing out these components in the fine scrubbing stage 6. Sodium carbonate forms under these conditions but is in no way lost for a desulfurization operation. To the contrary, the sodium carbonate is reused for hydrogen sulfide scrubbing in the fine scrubbing stage 5 by the flow of the sodium carbonate solution recovered from the bottom of the scrubbing stage 6 in line 6A. Line 6A is connected to line 9 which also feeds recycled sodium carbonate solution to the fine scrubbing stage 5.

According to the present invention, to assist in desulfurization and decyanization, the sodium carbonate solution is recycled to the scrubber 2 by line 9 from the hydrogen-sulfide/hydrogen-cyanide stripper 7, as already stated above, where it is admixed with the subflow from the fine scrubbing stage 6 in line 6A and recycled in the fine scrubbing stage 5. Before the sodium carbonate solution is introduced into the scrubber 2, the recycled flow is fed through a cooler 9A.

The concentrated scrubbing solution is collected in the bottom part of the fine scrubbing stage 5 and fed to the top of the hydrogen-sulfide/hydrogen-cyanide stripper 7 by line 10 after heating in a heat exchanger 10A. Vapors, saturated with water vapor and carbon dioxide, are fed from a coal liquor separator 11 by line 12 to the bottom part of stripper 7. The carbon dioxide content of these vapors extensively separates the hydrogen sulfide and hydrogen cyanide from the scrubbing solution in the stripper 7, thus regenerating the scrubbing solution. At the outlet of the stripper 7, the regenerated scrubbing solution is divided into two subflows, one flow is delivered by line 9 to the fine scrubbing stage 5 while the other subflow is delivered by line 13 to the top of the coal liquor separator 11 for use therein to separate fixed ammonia compounds in coal liquor which is fed by line 11A to this separator.

The vapors emerging from the top of the hydrogen-sulfide/hydrogen-cyanide stripper 7 are fed by line 14 to a deacidifier 15 wherein the enthalpy of the vapors is utilized to separate the acid components. Vapors from deacidifier 15 are delivered by line 16 to a hydrogen sulfide or Claus plant. Such a plant is subjected to much less loading because of the low carbon dioxide content of the vapors in line 16 as compared with the carbon dioxide content of vapors derived from a conventional coke oven gas washing process. Waste liquor from the coal liquor separator 11 is also free of sulfides due to the use of sodium carbonate instead of sodium sulfides/bisulfides as heretofore used in this art for separating fixed ammonia compounds. The waste liquor from the coal liquor separator is also less polluted. Since sodium carbonate, like caustic soda solution, also absorbs hydrogen sulfide and hydrogen cyanide from gases, the degree of utilization of a caustic soda solution is greatly increased overall in the process.

Thus, it can be seen that the process of the present invention provides that hydrogen sulfide is first removed with ammoniacal liquor and in a fine-purification stage, hydrogen sulfide is removed with a caustic soda solution or a caustic potash solution. A subflow is branched from the fine-purification circuit and fed to the stripper column 7 wherein sulfide is separated from the alkaline compound with vapors containing carbon dioxide derived from an ammonia separator, whereby the sodium or potassium carbonate which forms is re-used for further fine washing of the gases. This is carried out by the subflow of an aqueous carbonate solution that is cooled and recycled to the scrubber from the stripper column for further hydrogen sulfide scrubbing and thereby better utilization of the caustic soda solution. The second subflow of an aqueous carbonate solution at the outlet of stripper 7 is admixed at a temperature of about 100° C. with coal liquor that is fed into the top of separator 11 for removal of ammonia. In this way, no sulfitic compounds reach the waste liquor.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A process for removing hydrogen sulfide from gases, particularly coal distillation gases, said process including the steps of:

washing said gases with ammoniacal liquor to remove hydrogen sulfide, thereafter further washing said gases in a fine purification stage with an aqueous washing solution having an effective alkaline constituent selected from the group consisting of caustic soda and caustic potash, to further remove hydrogen sulfide, stripping hydrogen sulfide from said washing solution with vapors including carbon dioxide, producing said vapors by treating a subflow of said washing solution in an ammonia separator wherein sodium or potassium carbonate is also produced, and feeding the stripped hydrogen sulfide to a deacidifier.

2. The process according to claim 1 wherein said washing solution consists of sodium hydroxide.

3. The process according to claim 1 wherein said washing solution consist of sodium hydroxide at a concentration of about 3% to 5%.

4. The process according to claim 1 wherein said washing solution consists of an aqueous carbonate solution, and wherein said process includes the further steps of:

cooling a subflow of said aqueous carbonate solution after said step of stripping hydrogen sulfide, and thereafter feeding the cooled aqueous carbonate solution to a gas scrubber for said step of further washing.

5. The process according to claim 1 wherein said washing solution comprises an aqueous carbonate solution, and wherein said process includes the further step of:

admixing a subflow of said aqueous carbonate solution recovered from said step of stripping hydrogen sulfide at a temperature of about 100° C. with coal liquor fed to an ammonia separator.

6. The process according to claim 1 wherein said step of further washing comprises scrubbing said gases in each of two consecutive fine scrubbing states, operating a second of said scrubbing stages with freshly-charged washing solution, and operating a first of said scrubbing stages with the recycled washing solution recovered from said step of stripping hydrogen sulfide.

7. The process according to claim 6 wherein washing solution recovered from said second of the scrubbing stages is used together with regenerated washing solution recovered from said first of the scrubbing stages.

* * * * *